J. L. HERMAN.
UNIVERSAL LOAD BOX.
APPLICATION FILED SEPT. 5, 1912.
1,143,963.
Patented June 22, 1915.
2 SHEETS—SHEET 1.
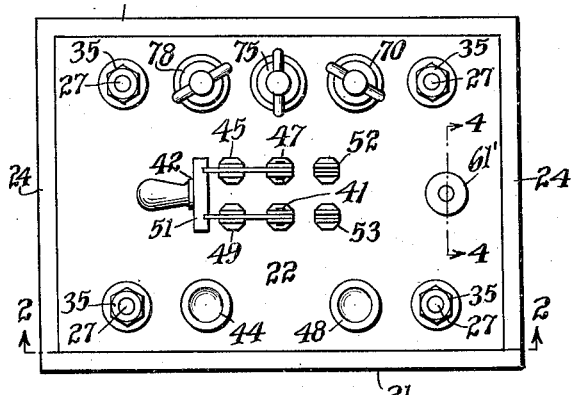
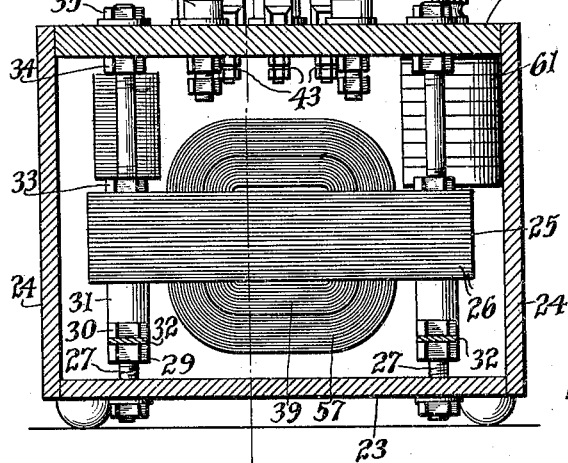
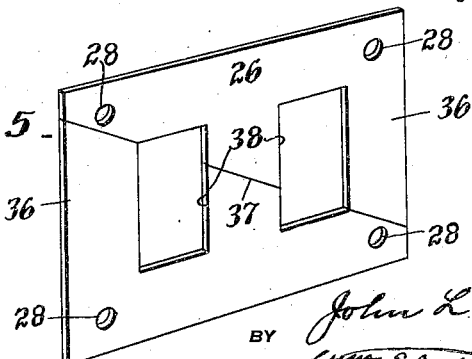
WITNESSES
Gertrude Bader
Thos. D. Moulds
INVENTOR
John L. Herman
BY
Wm Steell Jackson
ATTORNEY

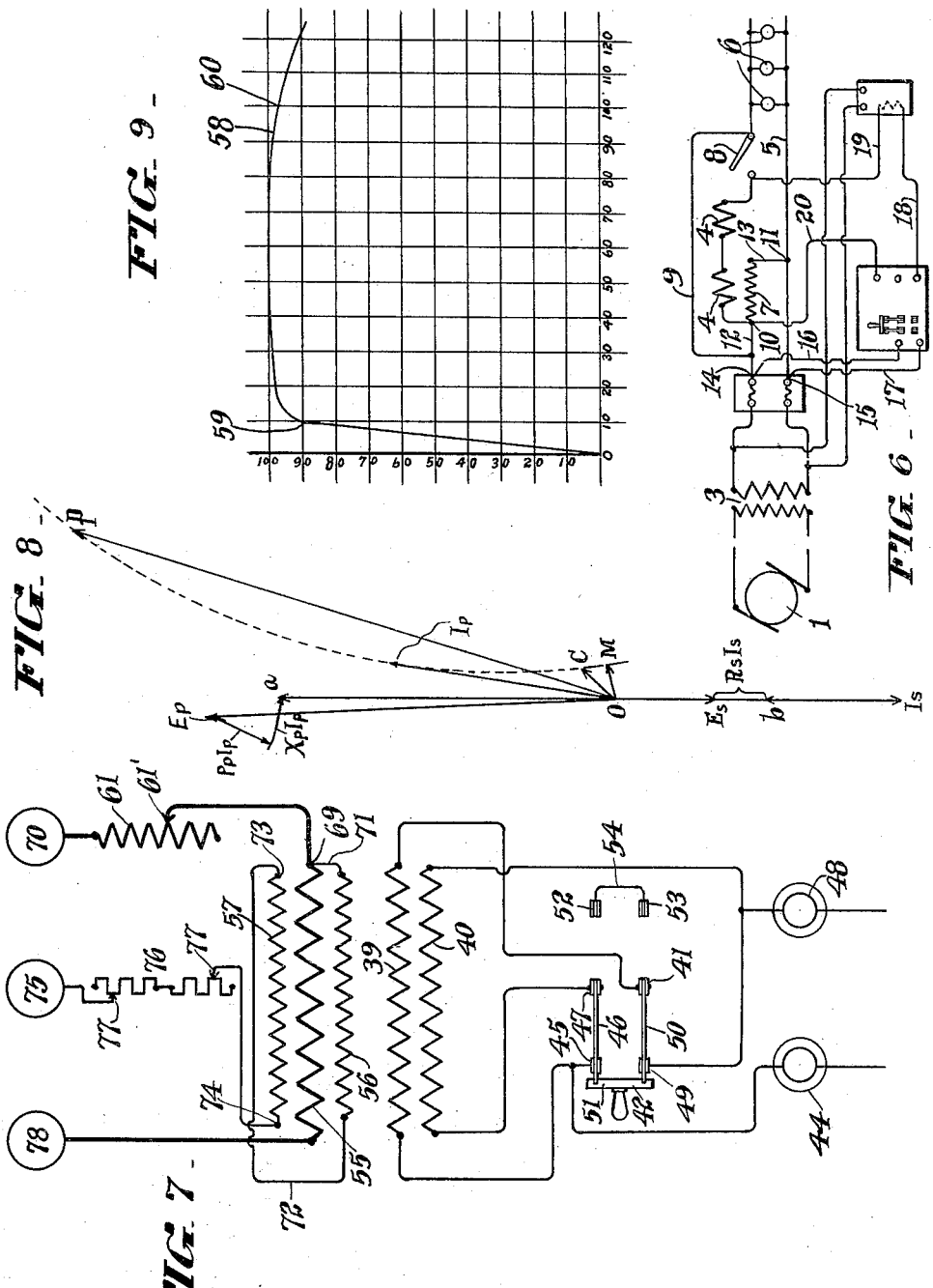

UNITED STATES PATENT OFFICE.

JOHN L. HERMAN, OF FORT WAYNE, INDIANA.

UNIVERSAL LOAD-BOX.

1,143,963.     Specification of Letters Patent.     Patented June 22, 1915.

Application filed September 5, 1912. Serial No. 718,627.

*To all whom it may concern:*

Be it known that I, JOHN L. HERMAN, a citizen of the United States, residing at 1324 Boone street, Fort Wayne, in the county of Allen and State of Indiana, have invented a certain new and useful Universal Load-Box, of which the following is a specification.

The purpose of my invention is to provide a non-inductive load in a transformer load box, preferably capable of use on two or more voltages interchangeably, giving substantially the same high power factor and conditions of service throughout the range of loads required.

A further purpose of my invention is to make use of an inductive resistance in a load box in series with a non-inductive resistance effectively so much larger than the former as to render the combined resistance substantially non-inductive.

A further purpose of my invention is to operate a transformer load box upon that portion of its curve of power-factor ordinates to percentage-of-full-load abscissae which is substantially horizontal so that there shall be no appreciable variation of power factor in the varying loads used.

A further purpose of my invention is to divide the secondary of a transformer load box into two or more parts, preferably placing different resistances in different parts thereof, and to use different secondaries or combinations of secondaries for different extents of load with increased power factor efficiency thereby.

A further purpose of my invention is to mechanically space one secondary of the transformer load box between two primary coils and to mount the other secondary upon these coils.

A further purpose of my invention is to provide a transformer load box with leakage in order to protect it and the instruments in circuit with it from injury by improper use.

A further purpose of my invention is to reduce the wattage required in transformer testing to a minimum.

A further purpose of my invention is to provide a load box for transformer testing having so low resistance and reactance in the secondary coil or coils thereof, that the impedance and reactance of the meter tested and test standard dominate the circuit, thus obtaining automatic adjustment of the secondary current to each current for which the meter and test instrument are fitted.

A further purpose of my invention is to supply to each meter tested the full amount of current for which it is designed over a considerable range of maximum currents for different meters and form the same load box connections, current of the secondary coil of the box being regulated automatically because its impedance is so low that the impedance of the combination is dominated by the combined secondary current resistance and reactance of each meter and test instrument used.

A further purpose of my invention is to impress upon the current coils of a meter being tested current from a load box secondary substantially in phase with the voltage supplied to the potential coils of the meter tested and the primary of the load box, comparing this primary electromotive force with the secondary current to obtain a hybrid power factor which is the "effective" power factor upon the meter tested.

A further purpose of my invention is to extend the high power factor range of a load box by successive coils with the same magnetic circuit, to cover the test range required for transformer test practice.

I have preferred to illustrate my invention by one form thereof, which under working conditions has been found to be simple, effective and relatively inexpensive and which at the same time well illustrates the principles involved.

Figure 1 is a top plan view of the preferred physical form in which I have embodied my invention. Fig. 2 is a section of the construction shown in Fig. 1, taken upon line 2—2 thereof. Fig. 3 is a section of the structure shown in Fig. 1, taken upon line 3—3 thereof. Fig. 4 is a broken section of the structure shown in Fig. 1 taken upon line 4—4 thereof. Fig. 5 is a perspective view of one of the core plates which may be used. Fig. 6 is a diagrammatic view of the connections used in testing. Fig. 7 is a diagrammatic view of the preferred electric circuits within my load box. Fig. 8 is a vector diagram explanatory of my invention. Fig. 9 is a power factor diagram plotted in percentages of full load.

In meter testing it is quite desirable that any artificial load used shall have a high power factor throughout the range of test. The power factor percentage required will differ slightly in the view of different engineers and designers and according to the requirements of special cases but for commercial work in testing the customers' transformers in electric light and power service, for which my invention will probably find its greatest extent of use, 90% may be assumed to be a satisfactorily high power factor: and I have arranged to maintain not less than 90% throughout the range of tests by two windings, one corresponding to approximately the first 10% of the range and the other to the remainder thereof. Obviously, if a higher power factor were required, the number of windings used and the portion of the total range covered by each can be so selected and they can be so combined by one skilled in the art in view of the disclosures herein contained as to maintain any reasonable desired power factor throughout the required range of tests.

The connections which are preferred by me for meter testing are shown in Fig. 6, the "full load" secondary being there shown. The current from any alternating source 1 is normally delivered to the subscriber's fuse block through a transformer having windings 2, 3, passes through the subscriber's meter current coil or coils 4 on the one side and conductor 5 on the other side to the lamps 6 or other load used by the subscriber. The potential coil 7 of the meter is thrown across the circuit. When a test is to be made the normal circuit through the meter current coils is interrupted at any suitable point, as at switch 8 and a jumper 9 is inserted so that the supply to the load 6 will not be interrupted. The potential coil or coils of the meter being tested are connected across the circuit, at any points 10, 11 as by conductors 12, 13. The primary of my box is then also connected across the circuit at any points 14, 15, as by conductors 16, 17, thus having impressed upon it the secondary voltage from the subscriber's transformer. The selected secondary of my transformer box is then connected in series with the current coil of the standard test instrument and the current coil of the subscriber's meter as by conductors 18, 19, 20.

My load box is itself a transformer and is intended for testing with substantially non-inductive loads; and, because its effective power factor is hybrid, being a composite angle of lag of a secondary current with respect to a primary electro-motive force, I will discuss the question of its effective power factor in connection with the vector diagram in Fig. 8 showing the vector relations of the voltages and currents in a transformer when carrying a non-inductive load. $OE_p$ is the voltage impressed upon the primary of the transformer. $Oa$ is the voltage in the primary after the primary resistance and reactance drops ($R_pI_p$ and $X_pI_p$) are vectorially subtracted from the impressed voltage $OE_p$. $OI_p$ is the primary load current of the transformer. Exactly 180° away from $Oa$ is the secondary induced voltage $Ob$. The secondary load current $OI_s$ is in phase with the secondary voltage $OE_s$ (since the load is non-inductive) and 180° away from $OI_p$ the primary current. $OE_s$ is equal to the induced voltage $Ob$ minus the $R_sI_s$ drop in the secondary winding of the transformer. The locus of the primary current $OI_p$ is a semicircle (partly shown, dotted) whose diameter is at right angles to the vector $OE_p$. If the load on the transformer be materially increased beyond full load, the current vector $OI_p$ will assume some such position as $OD$, thereby increasing the angle between $OE_p$ and $OI_p$ and thus decreasing the power factor. In a similar manner if the secondary load is decreased to a very low value, the current vector will swing back to some position such as $OC$ which again increases the angle between $OE_p$ and $OI_p$ and decreases the power factor. The minimum angle between $OI_p$ and $OE_p$ is determined by the amount or length of the magnetizing current $OM$, since the latter determines the position of the semi-circular current locus.

In a well designed transformer the magnetizing current is kept very small by making the leakage reactance as low as possible. In such a transformer the current vector $OI_p$ approaches very close to the voltage $OE_p$ within the ranges of loads at which the transformer is rated. Fig. 9 shows the power factor curve of such a transformer. It is seen that from 10% to 100% loads, the power factor is nearly unity; above and below these values it decreases rapidly. The regulation of this transformer is also good, the decrease in voltage at full load from the no-load voltage being not more than 3% of the rated voltage of the transformer. Considering, next, the application of transformers to meter testing: The voltage drop across the field coils of integrating wattmeters is approximately the same for all sizes of meters when each is carrying its rated full load current. That is, for example, a 50 ampere meter has .5 volt drop through its field coils when carrying its full load current of 50 amperes, a 5 ampere meter will also have .5 volt drop through its field coils when carrying its full load current of 5 amps. In other words while the current in the 5 ampere meter is one tenth that of the 50 ampere meter, the resistance of the field coils of the 5 ampere meter is ten times that of the latter, making the voltage drops across the meter coils the same for both.

By designing a transformer for a full load secondary current of say, 50 amperes and a secondary voltage equal to the drop through the meter field coils, the transformer will produce a current of 5 amperes when connected directly across the field coils of the 5 ampere meter. This is true because the resistance of the 5 ampere coil is ten times that of the 50 ampere coil. Since the meter coils are practically a non-inductive load, the secondary current of the transformer will be in phase with its voltage. The power factor on the primary of the transformer will be very near unity since it is operating on the flat part of the power factor curve (Fig. 9) at loads from 10% to 100% of full load. It has been shown that the primary and secondary currents are 180° apart in relation to each other. If the primary potential $OE_p$ (Fig. 8) be reversed, it will then have the same power factor with respect to the secondary current $OI_s$ that it previously had with respect to the primary current $OI_p$. That is, the power factor between the secondary current and the reversed primary voltage will be nearly unity for all loads ranging from 10% to 100% of the transformer rating as shown in Fig. 9. Therefore, for testing integrating wattmeters it is only necessary to apply the primary voltage with its leads reversed to the potential coil of the meter and to connect the field coils of the meter directly across the secondary of the transformer. For loads less than 10% of the transformer rating, the power factor between the primary voltage and secondary current becomes too low for testing the meter on non-inductive load conditions. That is, in the case of the 50 ampere transformer, 5 amperes is the lowest current at which good power factor can be obtained.

In order to test meters on loads below the 10% rating of the transformer, an auxiliary secondary winding is wound on the transformer, whose full load current is 10% that of the main winding. In doing this the transformer will be again operating upon the flat part of the power factor curve (Fig. 9) and currents as low as 1% of the transformer rating can be obtained at a power factor near unity. In a 50 ampere transformer, the full load current of the auxiliary winding is, preferably, 5 amperes. This coil may be advantageously wound to produce a potential of about 30 volts and to have a non-inductive resistance of 6 ohms in series with one leg of the transformer. When the winding is short-circuited on the resistance, a current of 5 amperes will flow, which is the full load current on the winding. If the field coils of an integrating wattmeter are put in series with the resistance, the current will remain practically the same since the additional resistance of the field coils (.1 ohm or less) is too small to change the current value appreciably. Lower values of current can be obtained by increasing the resistance in series with the field coils. The power factor will be nearly unity for current as low as .5 ampere which is 10% of the transformer rating. In order to have a good power factor, the transformer must have a low leakage reactance, thereby reducing the magnetizing current to a minimum. The transformer should be operated between approximately 10% and 100% load, as it will then be operating upon the flat part of the power factor curve at values near unity (Fig. 9). The rated secondary voltage of the transformer should be equal to the full load voltage drop through the meter field coils. The voltage drop through the field coils is practically the same for all meters when carrying its rated full load current. To obtain values of current which are less than 10% of the transformer rating, an auxiliary winding is used on the secondary of the transformer, making its full load current equal to the 10% current value of the main secondary winding. By this means the transformer is again operated between the 10% and 100% loads on the power factor curve.

Considering the mechanical construction and arrangement in my preferred form: In any convenient box having sides 21, 21 top 22 bottom 23 and ends 24—24 I mount a transformer core 25, made up of plates 26, secured as by bolts 27 passing through the openings 28 and held in place upon the bolts by nuts 29, 30 with suitable spacing sleeves 31 if desired. Upon the same bolts I secure plates or strips 32 uniting the bolts at their lower ends and stiffening the structure so that the top, carrying the entire operating structure, may be removed from the rest of the box for inspection or repairs. The plates or strips are retained in any convenient manner as by nuts 33 and the bolts are held in place upon the top of the box as by nuts 34. The top is held in position within the remainder of the box in any convenient manner, here shown as by nuts 35 upon ends of the bolts 27 which pass through the bottom of the box. I have shown a conventional form of core plate in Fig. 5 made up of two like parts 36, mating along line 37 reversely in alternate plates and providing openings 38 for the windings, permitting insertion of the core laterally within the complete windings.

Throughout the specification and claims it has been my intention to use the word core as referring to the entire magnetic foundation for the coils, including all of the laminated material and not to refer merely to any single leg, of which three are shown in the illustration. Obviously, in the design of the transformer, the coils could be distributed over the different legs with great flexibility, maintaining the relative position of the coils, if desired, in their spacing along magnetic lines though not confined to a single leg.

In order to provide for the use of different primary voltages (secondary voltages when considered with reference to the customer's service transformer) I divide the primary core winding into two parts 39 and 40, terminating one end of coil 39 in electrical contact with the hinge 41 of a double-pole, double-throw switch 42 through any suitable fastening 43, and connecting the other end of this coil electrically with binding post 44, with branch connection to one of the contacts, 45, made by that blade 46 of the double-pole switch which is hinged at 47. One terminal of the primary coil 40 is connected with binding post 48, with branch connection to the contact 49 made by blade 50 at the same time that the blade 46 makes contact at 45. The other end of coil 40 is electrically connected to the hinge 47. I have shown the same form of fastenings 43 for all the connections on the under side of the top of the box, retaining the several binding posts and switch parts. The switch 42 has its blades insulated by bar 51 and, at the other end of its throw, from that making contacts 45, 49 connects with contacts 52, 53 which are joined by loop 54. The connections thus outlined form a convenient means of throwing the current through the coils in parallel with one position of the switch 42, that shown in Fig. 7, and in series in the opposite position of the switch, giving equal effect in ampere turns, respectively in the two positions of the switch, with, say, 110 volts or with 220 volts impressed upon the terminals 44 and 48.

I have shown the secondary circuit as comprising a number of coils in order that different ranges of load may be tested by them. Obviously, the same principle would apply to any reasonable number of coils for separate parts of the test range, in order that the conditions sought, here particularly the high power factor, might be secured or maintained. I have divided the secondary into two parts for the purpose of securing a power factor which is ordinarily quite satisfactory, have made these parts meet, in order that the maintained power factor may be uninterrupted over the entire range in question, and have planned to overlap the parts to avoid accidental depression of the power factor curve where they meet. One of the parts, 55 of my divided secondary, is preferably wrapped directly upon the core between the two primary coils 39 and 40 and the other is conveniently split into two parts in series, 56 and 57 mounted upon the primary coils. This arrangement of 55, 56, and 57 is mechanically convenient and is also electrically desirable as it provides a desirable leakage of magnetization when the secondary coils are short-circuited, by reason of which the great increase of current through these coils does not result in all of the additional lines of magnetic force passing through the primary coils (which would reduce the impedance of the primary coils nearly to their resistance value with consequent excessive current flow through these coils and probable damage to them). I aim to protect from such a reduction of impedance by special arrangement of the coils with respect to each other and to the magnetic circuit, such that there will be considerable leakage; so that a part only of the additional magnetization from secondary short-circuiting shall pass through the primary coils. The mechanical placing shown forms one desirable arrangement for attaining this protection against injury from short-circuiting. I also provide a liberal quantity of copper in the transformer, reducing the resistance, particularly of the secondary coils. These as well as other features of the construction reduce the efficiency of the load box as a transformer. The reduction of efficiency, however, is of little moment in view of the small wattage required to operate the transformer.

It is desirable to give plenty of space for the coil 55 through to the core since I prefer to make the coil 55 of very low resistance and correspondingly large conductor cross section, winding it in the form of a flat strip having substantially the width of the space provided. I intend the coil 55 to carry the larger current values in the tests made, adapting it in the illustration to carry the load throughout approximately 90% of the range required, illustrated in Fig. 9, where it acts throughout the portion of the curve 58 between 59 and 60. I place it in series with a non-inductive resistance 61 which is adjustable by compression through means 61' shown in Figs. 2, 4 and 7. The connections with this resistance shown are at 62 in Fig. 4 where the bolt 64 holds the terminal 65 against the carbon end 66 at one point and where the terminal wire for a plate 67 is pressed directly up against one of the preferably carbon plates 68 in the other connection. The resistance 61 is adjusted for calibration purposes and should ordinarily not require readjustment but may be changed at any time to secure the current values desired for the test there being taken.

In meter testing under the rules of the meter association any load placed upon the meter between 50% and 100% of the capacity for which the meter is intended is considered as "full load." Since substantially all commercial meters of the same rated capacity have nearly the same resistance and reactance a load box may be suited, and mine is designed, to provide a satisfactory load for the required full load test without adjustment on all meters upon the market of any one assigned capacity. The meters in use of each given capacity have also the same speed within the same permissive range of difference. The result is that adjustment of the resistance 61 after proper selection of the value of this resistance or readjustment after proper calibration of this coil of the load box would not ordinarily be required. The same is true of the resistance used in circuit with the other secondary coils 56 and 57, of my box or with any other required or desired secondary coils. The resistance and reactance of the meter to be adjusted and of the coils of a standard test instrument designed for the same current capacity as the meter, vary inversely with the capacities of the meters and instruments and in substantially the same ratio. By making the resistance and reactance of my secondary test coils extremely low, these become practically negligible in the total resistance and reactance of the circuits, with the result that the current flow through the secondary circuit including the standard instrument coil or coils and meter tested varies inversely with the resistance and reactance of the instrument and meter tested in each case, and may be made to agree with great accuracy without change of load box connections with the current for which meters of these capacities are designed, thus automatically adjusting the same load box to a considerable range of meter capacities and protecting the meters tested as well as the standard test instruments used against excessive current flow.

While there is no objection to having the current intended to pass through one secondary circuit, such as is illustrated in coils 56 and 57, pass also through another secondary coil, as for example, 55, the connections are somewhat simplified by keeping the circuits independent, and I have therefore preferred to divert the path of the second secondary circuit from that of the first at some such point as 69, preferably using a common binding post 70 for both, because of its convenience, and permissibly selecting the point 69 so as to make use of the resistance 61 as part of the resistance in this second secondary circuit. I therefore illustrate loop 71 as connecting the first secondary circuit with one end of coil 56, connecting the other end of this coil 56 as at 72 with the end 73 of coil 57 and connecting the end 74 of this latter coil with binding post 75 through a resistance 76 which is preferably non-inductive and adjustable, as at 77, chiefly for calibration purposes as already discussed. I prefer to form the resistance 76 of double wound wire but may except from this the adjustable parts.

It will be evident that the connections between binding posts 70 and 78 include but one coil and that one of large conductor cross section and few turns; that the connections between binding posts 70 and 75 include the relatively fine wire coils only of the secondary and both resistances; and that the connections between binding post 75 and 78 include both the coarse and the fine secondary windings and the resistance 76 only, so that in the form of connections shown I provide for either inclusion or exclusion of the coil 55 within the secondary circuit passing through the fine wire at will.

It will be evident that the shift from 110 to 220 volts with my box will make no difference in the secondary current, since there will be the same number of ampere turns in the primary in each case but that, the primary voltage being double in the latter case, the effect in testing will be to supply double the wattage. The core loss in the transformer will be the same on either voltage. It will be evident that for use, for example, in meter testing I avoid the intrusion and inconvenience required by use of the consumer's load; the bulk, fragility, excessive heat dissipation and lack of adaptability inevitable with lamp banks; the complication and cost of switch mechanism, the necessarily large provision for radiating surface, excessive danger of injury and rapid deterioration present where resistance load boxes are used; and the excessively low power factors of previous transformer load boxes which were not proof against overloads dangerous to themselves and to the instruments used with them. At the same time I have provided herein a substantially fool proof transformer load box of practically unlimited current range possibilities, which is automatic in giving the correct current for meters having different capacities and which uses a low wattage even for high effective loads, (resulting in negligible heat dissipation); that my box is adapted to high resistance instruments (such as a rotating standard with a one ampere coil or two and a half ampere meter coils), and for two or more voltage ranges; that it has a high power factor over the entire meter range; and that it is sufficiently light in weight to save the labor of one man in normal testing, is simple in design, is composed of but few parts and uses but three load posts for all loads.

Having thus described my invention, what I claim as new and desire to secure by Letters Patent is:—

1. A primary winding, two secondary windings having different load capacities and different ranges of high power factor and a common magnetic core for all three windings.

2. A primary winding, two secondary windings having different load capacities and different ranges of high power factor, a common magnetic core for all three windings and a resistance in circuit with each secondary.

3. A primary winding, two independent secondary windings having different load capacities and different ranges of high power factor and a common continuous magnetic core for all three windings.

4. In a load box for testing meters, a primary winding arranged in two parts, connections placing the parts in series or in parallel at will, a secondary winding in two parts superimposed upon the respective parts of the primary winding, a separate secondary winding of different load capacity located between the parts of said primary and superimposed secondary windings and a common continuous magnetic core for the windings.

5. In a load box for testing meters, a magnetic core, two primary windings thereon, spaced along the core, a secondary winding between the primary windings forming one secondary circuit and a secondary winding mounted upon each side of the first secondary winding and upon the primary windings having load capacity different from that of the first named secondary and forming a second secondary circuit.

6. A continuous magnetic core, divided primary windings thereon, a divided secondary winding, a secondary winding between the primary windings having different load capacity and different but overlapping range of high power factor from that of the first named secondary and connections for the several windings.

7. In a load box for testing meters, a primary winding, a magnetic core therefor, a secondary winding upon the same core having a high power factor over a designed range and a low power factor over the remainder of its range, and a second secondary upon the same core having a much greater resistance and a high power factor range corresponding nearly to the lower power factor range of the first secondary.

8. In a load box for testing meters, a magnetic core, a primary winding thereon, two secondary windings about the same core having markedly different load capacities and markedly different ranges of high power factor and a resistance in series with each secondary winding, the impedances of the secondary circuits being different and both low.

9. In a load box for testing meters, a magnetic core, a primary circuit thereon, a secondary winding upon the primary having low impedance, fixed for any given current and adapted to allow considerable leakage of magnetization induced by the current therein, free from the primary winding, and a second secondary winding upon the same core and having much greater load capacity and a different range of high power factor than the first named secondary winding.

10. In a load box for testing meters, a magnetic core, a primary winding upon the core, therefor, an outside secondary circuit, a secondary winding adapted to be connected to the secondary circuit and whose current has a low angle of lag, for a portion of the load, behind the electromotive force of the primary circuit and a second secondary winding of much different load capacity than that of the first secondary winding adapted to be connected to the same secondary circuit and whose current has a low angle of lag, for an adjoining part of the load, behind the primary electromotive force.

11. In a load box for testing meters, a magnetic core, a primary winding thereabout, therefor, an outside secondary circuit and a plurality of secondary windings of different cross sectional area per turn about the same core adapted to be connected with said secondary circuit, the current in said secondary windings and the primary electromotive force having phase relations providing high power factors for different ranges of the load.

12. In a load box for testing meters, a magnetic core, a primary winding thereabout, therefor, an outside secondary circuit and a plurality of secondary windings of different cross sectional area per turn about the same core adapted to be connected with said secondary circuit and having different load capacities, the current in said secondary windings and the primary electromotive force having phase relations providing high power factors for different ranges of the load.

13. In a load box for testing meters, a continuous magnetic core, a primary winding upon the core and a plurality of independent secondaries of much different load capacities about said core having different ranges of high power factor and having the maximum range of one secondary overlapping the minimum range of the other secondary.

14. In a load box for testing meters, a primary winding, a magnetic core therefor, two secondary windings of different load capacities and different ranges of high power factor about the same core and separate circuits for said two secondary windings, one circuit including a substantially non-inductive resistance.

15. In a load box for testing meters, a magnetic core, a primary winding thereon divided into two spaced parts, means for throwing these parts in series or multiple at will, in combination with two secondaries upon the same core and having much different load capacities and much different ranges of high power factor.

16. In a load box for testing meters, a magnetic core, a primary winding thereon, and a plurality of secondary windings upon the same core as the primary winding, adapted to be connected for different loads, and having different but overlapping ranges of load capacity, the current in said secondary windings and the primary electromotive force having phase relations providing high power factors for different ranges of the load.

17. In a load box for testing meters, a magnetic core, a pair of spaced primary windings thereon, means for connecting them in series or parallel at will, a pair of spaced secondary windings in series about the core and a second secondary winding of different load capacity from that of the first secondary, lying between the parts of the first secondary and having its load capacity overlapping that of the first secondary.

18. In a load box for testing meters, a magnetic core, a pair of spaced primary windings thereon, a pair of secondary windings in series, superimposed upon the primary windings, a second secondary upon the core located between the parts of the primary and first secondary and means for connecting the two secondaries independently or in series at will.

JOHN L. HERMAN.

Witnesses:
ROSE G. SWETZ,
JOHN W. EGGEMAN.

Copies of this patent may be obtained for five cents each, by addressing the "Commissioner of Patents. Washington, D. C."